United States Patent [19]
Schnellmann et al.

[11] 4,083,665
[45] Apr. 11, 1978

[54] APPARATUS FOR MANUFACTURING A FOAMED ARTICLE FORMED OR PRE-EXPANDED POLYSTYRENE

[75] Inventors: Klaus Schnellmann; Walter Kilchenmann; Hans Ulrich Hauser, all of Niederweningen, Switzerland

[73] Assignee: Bucher-Guyer AG Maschinenfabrik, Niederweningen, Switzerland

[21] Appl. No.: 624,954

[22] Filed: Oct. 22, 1975

[30] Foreign Application Priority Data

Oct. 31, 1974 Switzerland ............... 14586/74

[51] Int. Cl.² .................................. B29D 27/00
[52] U.S. Cl. ....................... 425/144; 236/101 R; 249/141; 425/817 R; 425/812
[58] Field of Search ............... 425/143, 4 R, 817 R, 425/144, 420, 812; 264/53, DIG. 10; 236/93 B, 93 D, 101, 93 R; 164/410; 137/457; 249/79, 141, 113; 138/46

[56] References Cited

U.S. PATENT DOCUMENTS

| | | |
|---|---|---|
| 3,038,664 | 6/1962 | Gould ............... 236/93 B |
| 3,193,876 | 7/1965 | Thompson ............ 425/4 R |
| 3,263,926 | 8/1966 | Couffer et al. ........ 236/93 B |
| 3,264,381 | 8/1966 | Stevens ............... 425/817 |
| 3,515,346 | 6/1970 | Hayner et al. ....... 236/101 R X |
| 3,735,922 | 5/1973 | Fujiwara ............. 236/101 R X |

Primary Examiner—Francis S. Husar
Assistant Examiner—Mark Rosenbaum
Attorney, Agent, or Firm—Werner W. Kleeman

[57] ABSTRACT

An apparatus for the manufacture of a foamed molded article or part from pre-expanded polystyrene comprising a hollow mold compartment which communicates with a vapor chamber or compartment at least at the region of one of its walls by means of passageways or openings provided therein. Each passageway or opening is controlled by a valve arrangement responsive to the vapor temperature and which closes such passageway when the vapor temperature exceeds a temperature range contemplated for a limited foaming.

9 Claims, 4 Drawing Figures

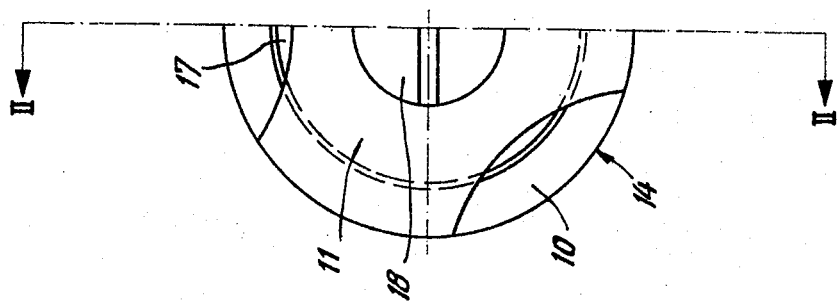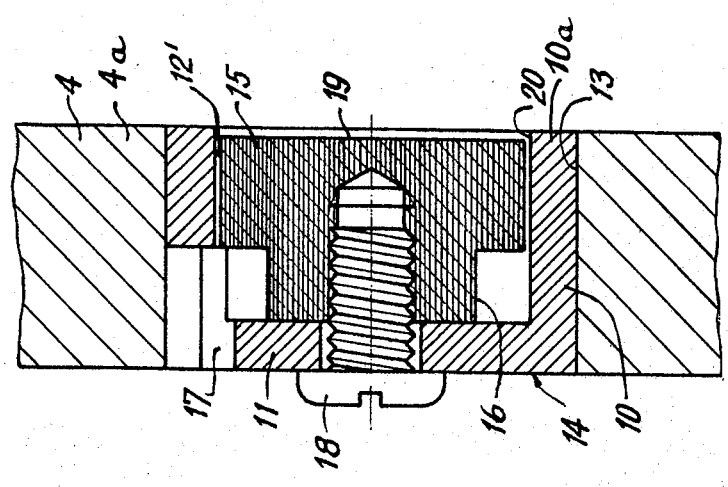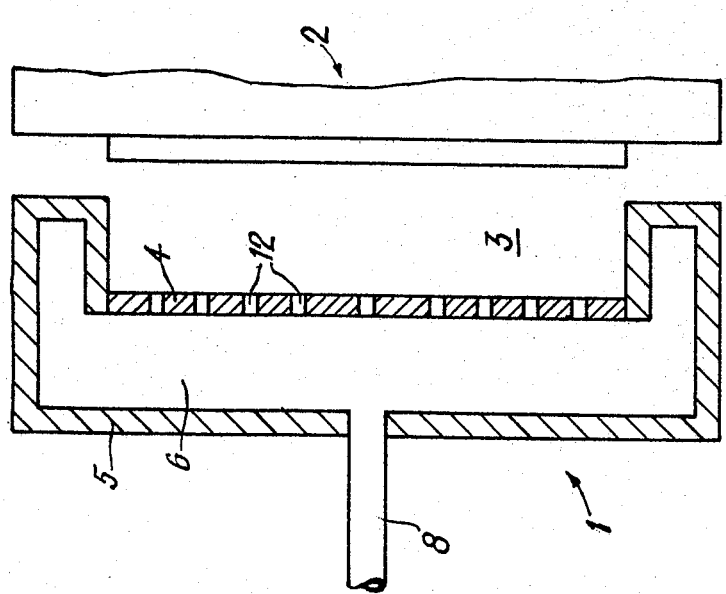

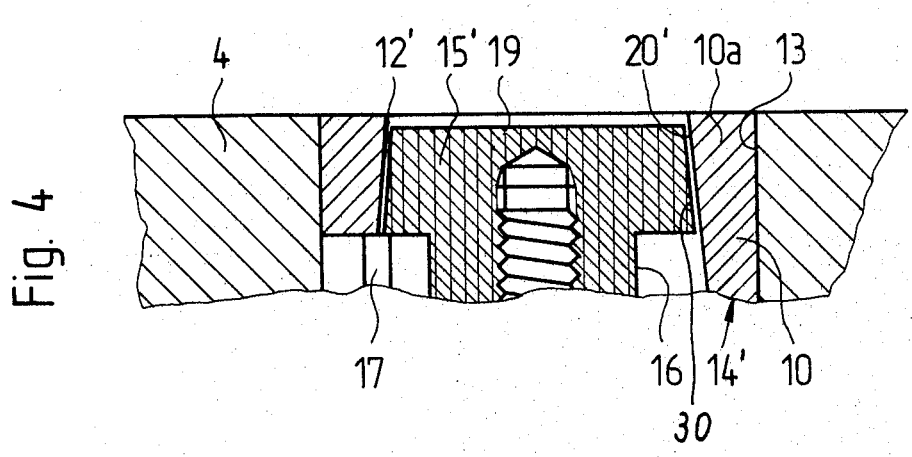

APPARATUS FOR MANUFACTURING A FOAMED ARTICLE FORMED OR PRE-EXPANDED POLYSTYRENE

BACKGROUND OF THE INVENTION

The present invention relates to a new and improved construction of apparatus for manufacturing a foamed part or article of plastic material, especially from pre-expanded polystyrene, comprising a hollow mold compartment which communicates with a vapor chamber or compartment at least at the region of one of its walls by means of passageways or openings provided therein.

SUMMARY OF THE INVENTION

A primary object of the present invention aims at fabricating molded articles possessing a highly compacted, relatively hard outer layer in relation to the core, satisfying increased requirements with regard to dimensional stability and wear resistance and capable of being used, for instance, in lieu of structural elements heretofore fabricated of wood.

A further object of this invention is concerned with the provision of novel apparatus for producing a foamed plastic article, especially formed of pre-expanded polystyrene, possessing the aforementioned beneficial properties or characteristics.

Still a further significant object of this invention is the provision of a new and improved construction of apparatus for fabricating a foamed article or part of pre-expanded polystyrene, in a highly efficient, economical and reliable manner.

In recognition of the fact that the degree of foaming and the thus resultant density of the material of the molded article or the like depends upon the thermal effects, it is a further object of the invention to provide an apparatus which renders it possible, following a first vapor surge at which the vapor temperature is determined or maintained such that there is realized at the core portions of the molded article a uniform foaming of the polystyrene granules to a limited degree of foaming, to deliver during the same vaporization cycle by increasing the vapor temperature thermal energy or heat only still to the outer layer of the molded article to thereby bring about in such layer an optimum foaming of the polystyrene granules.

Now in order to implement these and still further objects of the invention, which will become more readily apparent as the description proceeds, the apparatus of this development is constructed in such a manner that each passageway or opening or the like is controlled by a valve arrangement responsive to the vapor temperature and which closes the passageway when the vapor temperature exceeds a temperature range of temperature provided for limited foaming.

By virtue of this construction it is possible, following a first vaporization phase during which the granules are uniformly foamed to a limited degree in the hollow mold compartment, to introduce into the vapor or steam chamber superheated steam or vapor during a second vaporization phase. Since the closure elements of the valve arrangements close the passageways under the influence of the increasing temperature, the superheated steam or vapor can only arrive per unit of time and to a limited penetration depth in the hollow mold compartment, thereafter however can only be thermally effective at the surface of the molded article by heating-up the mold wall, and thus can initiate in the outer skin or layer of the molded article a melting or fusing of the polystyrene granules with a high degree of foaming. Stated in another way, in the first stage or phase there can be obtained a uniformly foamed, homogeneous internal structure, and directly thereafter the polystyrene granules which have been softened during the first stage are transformed at the region of the surface of the molded article, due to the thermal concentration at such region, during the second stage into the dense or compact, hard outer layer. The homogeneous inner or internal structure is retained and insures for the greatest possible degree of non-deformability of the molded article. What is important in this regard is that the passageways or openings are closed during the second vaporization phase or stage, so that they cannot become clogged due to the penetration of molten material.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 schematically illustrates a vaporization mold in the open condition, the left-hand mold half being shown in sectional view and the right-hand mold half merely being conveniently schematically illustrated in fragmentary view;

FIG. 2 is an enlarged detail sectional view of part of the mold arrangement of FIG. 1, the section being taken substantially along the line II-II of FIG. 3;

FIG. 3 is an enlarged fragmentary view of the showing of FIG. 2 looking in the direction from the left-side thereof towards the right; and FIG. 4 is an enlarged fragmentary view of a modified arrangement from that shown in FIG. 2.

DETAILED DESCRIPTION OF THE INVENTION

Turning now to the drawing, the exemplary embodiment of vaporization mold illustrated therein has the mold shell or jacket portion generally designated by reference character 1 and the mold core portion by reference character 2. The mold core portion or part 2 can be displaced with the aid of any suitable and therefore not particularly illustrated drive means in the direction of the mold shell or jacket portion 1. The two mold parts or portions 1 and 2, in the closed condition of the mold, form a hollow mold compartment or cavity 3 in which there is produced the molded article or part or the like —hereinafter generally usually referred to as the molded article.

In the embodiment under discussion it will be seen that as far as the mold shell portion or part 1 is concerned a base plate 4 defining a wall and the walls 5 enclose a vapor or steam chamber. Opening centrally into the vapor chamber 6 is a vapor or steam infeed line or conduit 8. Vapor or steam passageways or openings 12 piercingly extend through the base plate 4 and thereby flow communicate the vapor or steam chamber 6 with the hollow mold compartment or cavity 3. Details relative to the foregoing construction have been illustrated on an enlarged scale in FIGS. 2 and 3.

Now for each passageway or opening 12 in the base plate or wall 4 there is provided a substantially cylindrical recess or opening 13 into which there is inserted a substantially pot-shaped insert member 14. Within this substantially pot-shaped insert member 14 there is located a substantially cylindrical closure element or body 15 bearing against the floor 11 of the insert member 14 which defines a housing. The closure element 15 has a stepped portion or configuration at location 16 neighboring the housing floor 11. In the floor 11 and at the neighboring jacket portion or outer wall of the insert member 14 there are provided recesses or openings 17 (cf. also FIG. 3), so that the vapor can move from the left-hand side of the base plate 4 —considered with regard to the showing of FIG. 2— through such recesses 17 and past the stepped portion 16 into a substantially annular or ring-shaped throughpassage 12' between the closure element 15 and the shell or wall 10 of the insert member 14 and from that location into the hollow mold compartment 3. Of course to the other side these recesses communicate with the vapor chamber or compartment 6. The free end surface 19 of the closure element 15 is held by holding means, for instance a screw 18 or equivalent structure, in the insert member 14 is almost flush with the corresponding or neighboring surface 4a of the base plate i.e. with the wall 4 of the hollow mold compartment 3.

The closure element 15 is selected to be formed from a material which in relation to the material from which there is formed the insert member 14 and the base plate 4, respectively, possesses a considerably greater coefficient of thermal expansion in such a manner that as a function of the vapor temperature the throughpassage 12' —as illustrated— is opened or, is then closed when the closure element 15 comes to bear upon the therewith associated seat or seat means 20 of the insert member 14 due to thermal expansion of the closure element 15. By suitably selecting the materials and the dimensions the arrangement is carried out such that a construction is realized wherein the passageways 12 are closed when the vapor temperature exceeds a temperature range or temperature contemplated for limited foaming of the plastic material from which the molded article is formed. In the context of this disclosure the expression temperature range is also intended to embody not only a range of temperature but a temperature. Owing to the thermal expansion of the closure element 15 in axial direction the end surface 19 comes to lie at the face plane or surface 10a of the shell or jacket 10 of the insert member or insert 14. It should be appreciated that the closure element and the seat means can possess substantially cylindrical effective surfaces or substantially cone-shaped effective surfaces. Thus, in the modified mold arrangement of FIG. 2, wherein generally the same reference characters have been employed for like elements as in the embodiment of FIGS. 1 to 3, there is shown a modified form of insert member 14' whose seat means 20' have cone-shaped effective surfaces 20' which cooperate with complementary cone-shaped effective surfaces 30 of the closure element 15'.

Having had the benefit of the discussion of the construction of the apparatus as disclosed above it is now possible to consider the operation which is as follows:

During a first vaporization phase or stage there occurs the foaming of the polystyrene stock located in the hollow mold compartment 3 at a low pressure of 2 atmospheres excess pressure, the entire molding mass being penetrated by steam or vapor and initially being foamed so as to possess a uniform cell structure. During a second vaporization phase or stage there is supplied steam at elevated temperature, for instance, exceeding 120° C. This steam can enter for a short period of time into the hollow mold compartment, however only with a slight penetration depth since the closing or closure elements 15 shut-off the associated throughpassage or passageway 12'. The hotter steam or vapor is thus effective during a second vaporization phase only in an outer layer of the molded article in order to initiate at that location a melting or fusing process of the polystyrene granules or beads with an increased degree of foaming. Thereafter, the steam is only however effective at the walls of the hollow mold compartment, so that the thus resulting concentration of thermal energy only acts upon the polystyrene locally at the region of such walls and causes the material to melt. The melt formed in this manner in an outer layer or skin of the molded article is transformed during the subsequent cooling process into the solid state, and the molded article possesses a smooth, dimensionally stable and wear resistant outer skin. On the other hand, in the core portion where the foaming process has only proceeded to the point of softening the polystyrene beads or granules, these softened beads —fused together in the solidifed state— form a homogeneous mass of low density which imparts to the (rigid and wear resistant) molded article a low weight and a high thermal insulating property.

Advantageously, the vapor temperature during the second vaporization phase is in the order of between 120° and 250° C, increasing of the temperature can be brought about either with the aid of a vapor or steam superheater or by increasing the vapor pressure. Following the second vaporization phase or stage is the cooling phase (if desired, there can be interposed a further vaporization phase) during which the vapor temperature is again reduced below 120° C and the closure elements 15 again free the throughpassages or passageways 12'.

Due to the described measures there is eliminated clogging of the passageways by the molten material during forming of the hard wear resistant outer skin of the molded article, this molded article also being smooth-walled at the region of the throughpassages or passageways. Suitable as a material for the closure elements there can be likewise used a plastic, for instance, "TEFLON", and the softening temperature of whatever selected material of course must be above that of the material to be processed. It should therefore be understood that each of the closure elements can be formed of another suitable material.

Furthermore, the person initiated in the art has a considerable degree of freedom of variation also with regard to the construction of the actual valve arrangement which previously was discussed on the basis of a closure element and an associated seat or seat means. Thus, for instance, the seat and the associated countersurface of the closure element can be of substantially cone-shaped configuration as discussed above, wherein, in contrast to the illustrated embodiment, there is utilized —instead of the radial expansion— the axial expansion of the closure element. It is also conceivable to modify the closure element so that it is not formed of a single material, rather of suitable combinations of materials wherein at least one element or component assumes the role of a thermal expansion element.

Since the valve arrangement and the associated structure is advantageously normally the same for each passageway it is sufficient to have considered such structure in terms of a single passageway as illustrated specifically in FIGS. 2 and 3 and discussed in conjunction therewith heretofore.

While there are shown and described present preferred embodiments of the invention, it is to be distinctly understood that the invention is not limited thereto, but may be otherwise variously embodied and practiced within the scope of the following claims.

Accordingly, we claim:

1. An apparatus for the manufacture of a foamed molded article of plastic, especially pre-expanded polystyrene, comprising a mold provided with a hollow mold compartment, walls defining said hollow mold compartment, said hollow mold compartment being provided at least at the region of one of its walls with passageways, means within said walls defining a vapor chamber, said passageways communicating the hollow mold compartment with said vapor chamber, a valve arrangement disposed in each passageway and responsive to the vapor temperature for controlling each passageway, each valve arrangement closing its associated passageway when the vapor temperature exceeds a temperature range provided for limited foaming of the plastic molded article, each valve arrangement comprising an insert means provided with seat means provided for the associated passageway and a closure element cooperating with said seat means, said closure element having a free end surface, means for fixedly securing the closure element and insert means to one another at a location remote from said free end surface, each passageway being formed between the closure element and the seat means thereof, the material of the closure element and the inner width of the passageway are selected such that the closure element comes into contact with the seat means due to thermal expansion when the vapor temperature exceeds said temperature range and with said free end surface of said closure element expanding in the direction of said hollow mold compartment to form a surface which is substantially flush with said wall provided with said passageways, said closure element and said seat means coming out of contact with one another due to contraction of said closure element upon dissipation of the thermal energy which caused said thermal expansion.

2. The apparatus as defined in claim 1, wherein the securing means for the closure element is anchored at a wall of the hollow mold compartment.

3. The apparatus as defined in claim 2, wherein the closure element and the seat means possess substantially cylindrical effective surfaces.

4. The apparatus as defined in claim 2, wherein the closure element and the seat means possess substantially coneshaped effective surfaces.

5. The apparatus as defined in claim 1, wherein said insert means comprises a housing within which there is mounted the associated closure element, a wall of the hollow mold compartment being provided with recess means into which there is inserted said housing.

6. An apparatus for the manufacture of a foamed molded article of plastic, especially pre-expanded polystyrene, comprising a mold provided with a hollow mold compartment, walls defining said hollow mold compartment, said hollow mold compartment being provided at least at the region of one of its walls with passageways, means within said walls defining a vapor chamber, said passageways communicating the hollow mold compartment with said vapor chamber, a valve arrangement located in each passageway and responsive to the vapor temperature for controlling each passageway, each valve arrangement closing its associated passageway when the vapor temperature exceeds a temperature range provided for limited foaming of the plastic molded article, each valve arrangement comprising seat means provided for the associated passageway and a closure element cooperating with said seat means, said closure element having a free end surface, each passageway being formed between the closure element and the seat means thereof, the material of the closure element and the inner width of the passageway are selected such that the closure element comes into contact with the seat means due to thermal expansion when the vapor temperature exceeds said temperature range, each passageway has a mouth opening into the hollow mold compartment, the closure element of each passageway when in its closed position extending into the mouth of the passageway opening into the hollow mold compartment and possessing a boundary surface defined by said free end surface which is flush with said wall of the hollow mold compartment provided with said passageways, a housing within which there is mounted the associated closure element, a wall of the hollow mold compartment being provided with recess means into which there is inserted said housing, said housing possesses a substantially pot-shaped construction, said housing having a floor, means for anchoring the closure element at the floor of the housing remote from said free end surface of said closure element.

7. An apparatus for the manufacture of a foamed molded article of plastic, especially pre-expanded polystyrene, comprising a mold provided with a hollow mold compartment, walls defining said hollow mold compartment, said hollow mold compartment being provided at least at the region of one of its walls with passageways, means within said walls defining a vapor chamber, said passageways communicating the hollow mold compartment with said vapor chamber, a valve arrangement located in each passageway and responsive to the vapor temperature for controlling each passageway, each valve arrangement closing its associated passageway when the vapor temperature exceeds a temperature range provided for limited foaming of the plastic molded article, each valve arrangement comprising seat means provided for the associated passageway and a closure element cooperating with said seat means, said closure element having a free end surface, each passageway being formed between the closure element and the seat means thereof, the material of the closure element and the inner width of the passageway are selected such that the closure element comes into contact with the seat means due to thermal expansion when the vapor temperature exceeds said temperature range, each passageway has a mouth opening into the hollow mold compartment, the closure element of each passageway when in its closed position extending into the mouth of the passageway opening into the hollow mold compartment and possessing a boundary surface defined by said free end surface which is flush with said wall of the hollow mold compartment provided with said passageways, a housing having a housing floor within which there is mounted the associated closure element, a wall of the hollow mold compartment being provided with recess means into which there is inserted said housing, means for anchoring the closure element at said housing floor at a location remote from said free end surface of said closure element, and wherein a part of the closure element confronting the housing floor possesses a stepped configuration and said housing floor at the region of the stepped configuration being provided with openings.

8. The apparatus as defined in claim 7, wherein an end surface of the closure element confronting the housing floor is located in a plane of an edge of the housing in the closed position of the closure element.

9. An apparatus for the manufacture of a foamed molded article of plastic, especially pre-expanded polystyrene, comprising a mold provided with a hollow mold compartment, walls defining said hollow mold compartment, said hollow mold compartment being provided at least at the region of one of its walls with passageways, means within said walls defining a vapor chamber, said passageways communicating the hollow mold compartment with said vapor chamber, a valve arrangement located in each passageway and responsive to the vapor temperature for controlling each passageway, each valve arrangement closing its associated passageway when the vapor temperature exceeds a temperature range provided for limited foaming of the plastic molded article, each valve arrangement comprising insert means provided with seat means provided for the associated passageway and a closure element cooperating with said seat means, said closure element having a free end surface, means for fixedly securing said closure element and insert means to one another at a location remote from said free end surface, each passageway being formed between the closure element and the seat means thereof, the material of the closure element and the inner width of the passageway are selected such that the closure element comes into contact with the seat means due to thermal expansion when the vapor temperature exceeds said temperature range and with said free end surface of said closure element expanding in the direction of said hollow mold compartment to form a surface which is substantially flush with said wall provided with said passageways, and wherein the closure element comes to bear against said seat means at a vapor temperature of about 120° C.

* * * * *